(12) United States Patent
Fischer et al.

(10) Patent No.: US 9,574,527 B2
(45) Date of Patent: Feb. 21, 2017

(54) FRESH AIR SYSTEM COMPONENT

(71) Applicant: Mahle International GmbH, Stuttgart (DE)

(72) Inventors: Robert Fischer, Bietigheim (DE); Thomas Zirkelbach, Tamm (DE)

(73) Assignee: Mahle International GmbH (DE)

( * ) Notice: Subject to any disclaimer, the term of this patent is extended or adjusted under 35 U.S.C. 154(b) by 96 days.

(21) Appl. No.: 14/414,231

(22) PCT Filed: Jul. 9, 2013

(86) PCT No.: PCT/EP2013/064476
§ 371 (c)(1),
(2) Date: Jan. 12, 2015

(87) PCT Pub. No.: WO2014/009364
PCT Pub. Date: Jan. 16, 2014

(65) Prior Publication Data
US 2015/0152818 A1   Jun. 4, 2015

(30) Foreign Application Priority Data
Jul. 12, 2012  (DE) .................. 10 2012 212 251

(51) Int. Cl.
*B60R 21/34* (2011.01)
*B60R 21/38* (2011.01)
(Continued)

(52) U.S. Cl.
CPC ........ *F02M 35/02416* (2013.01); *B60R 21/34* (2013.01); *F02M 35/0201* (2013.01); *B01D 46/0002* (2013.01); *B60R 2021/343* (2013.01)

(58) Field of Classification Search
CPC ..... B01D 46/0002; B60R 21/34; B60R 21/38; B62D 25/04
(Continued)

(56) References Cited

U.S. PATENT DOCUMENTS 6,802,556 B2 * 10/2004 Mattsson ................ B60R 21/38
180/274
7,597,384 B2 * 10/2009 Wallman ................. B60R 21/34
180/69.2
(Continued)

FOREIGN PATENT DOCUMENTS

DE   102004054274 A1   5/2006
DE   102005007089 A1   8/2006
(Continued)

OTHER PUBLICATIONS

English abstract for JP2009-293535.
(Continued)

*Primary Examiner* — Jacob T Minskey
*Assistant Examiner* — Minh-Chau Pham
(74) *Attorney, Agent, or Firm* — Fishman Stewart PLLC

(57) ABSTRACT

A fresh air system component of a fresh air system serving to supply fresh air to an internal combustion engine may include a housing that may have a first shell and a second shell. The housing may delimit at least one fresh air path that may run from at least one fresh air inlet of the housing to at least one fresh air outlet of the housing. The second shell may be secured along a second shell edge to a first shell edge of the first shell. The second shell edge may be more flexible than the first shell. The second shell may have at least one second support element that may be at a distance from the second shell edge. The second support element may interact with a first support element that is complementary thereto in order to transmit at least one of a tensile force and a compressive force.

20 Claims, 6 Drawing Sheets

(51) Int. Cl.
  *B62D 25/04* (2006.01)
  *F02M 35/024* (2006.01)
  *F02M 35/02* (2006.01)
  *B01D 46/00* (2006.01)

(58) Field of Classification Search
  USPC ........... 55/385.3, 495, 501; 180/69, 21, 274; 292/201, 216; 296/187.04, 193.11
  See application file for complete search history.

(56) References Cited

U.S. PATENT DOCUMENTS

| | | | |
|---|---|---|---|
| 7,712,569 B2* | 5/2010 | Scheuch | B60R 21/38 180/274 |
| 7,823,959 B2* | 11/2010 | Wallman | B60R 21/34 293/120 |
| 7,845,691 B2* | 12/2010 | Sundararajan | B60R 21/38 180/274 |
| 7,998,232 B2* | 8/2011 | Krueger | B60R 21/34 180/274 |
| 8,146,701 B2 | 4/2012 | Spannbauer et al. | |
| 8,562,706 B2* | 10/2013 | Siber | B01D 46/0002 55/385.3 |
| 8,585,340 B2 | 11/2013 | Schmitz et al. | |
| 2001/0040392 A1* | 11/2001 | Yoshida | B62D 25/04 296/203.02 |
| 2006/0234619 A1 | 10/2006 | Mori et al. | |

FOREIGN PATENT DOCUMENTS

| | | |
|---|---|---|
| DE | 102005051676 A1 | 5/2007 |
| DE | 102006023350 A1 | 11/2007 |
| DE | 102008038564 A1 | 2/2010 |
| DE | 102010014079 A1 | 10/2011 |
| EP | 1426237 A1 | 6/2004 |
| EP | 2036787 A2 | 3/2009 |
| FR | 2938221 A1 | 5/2010 |
| JP | 2004-308453 A | 11/2004 |
| JP | 2006-138203 A | 6/2006 |
| JP | 2006-266239 A | 10/2006 |
| JP | 2009-293535 A | 12/2009 |
| WO | WO-2006/051072 A1 | 5/2006 |

OTHER PUBLICATIONS

English abstract for JP2004-308453.
English abstract for FR-2938221.
English abstract for DE-102008038564.
English abstract for DE-102006023350.
English abstract for DE-102005051676.
English abstract for JP2006-138203.
English abstract for EP-1426237.
English abstract for DE102005007089.
English abstract for DE-102004054274.

* cited by examiner

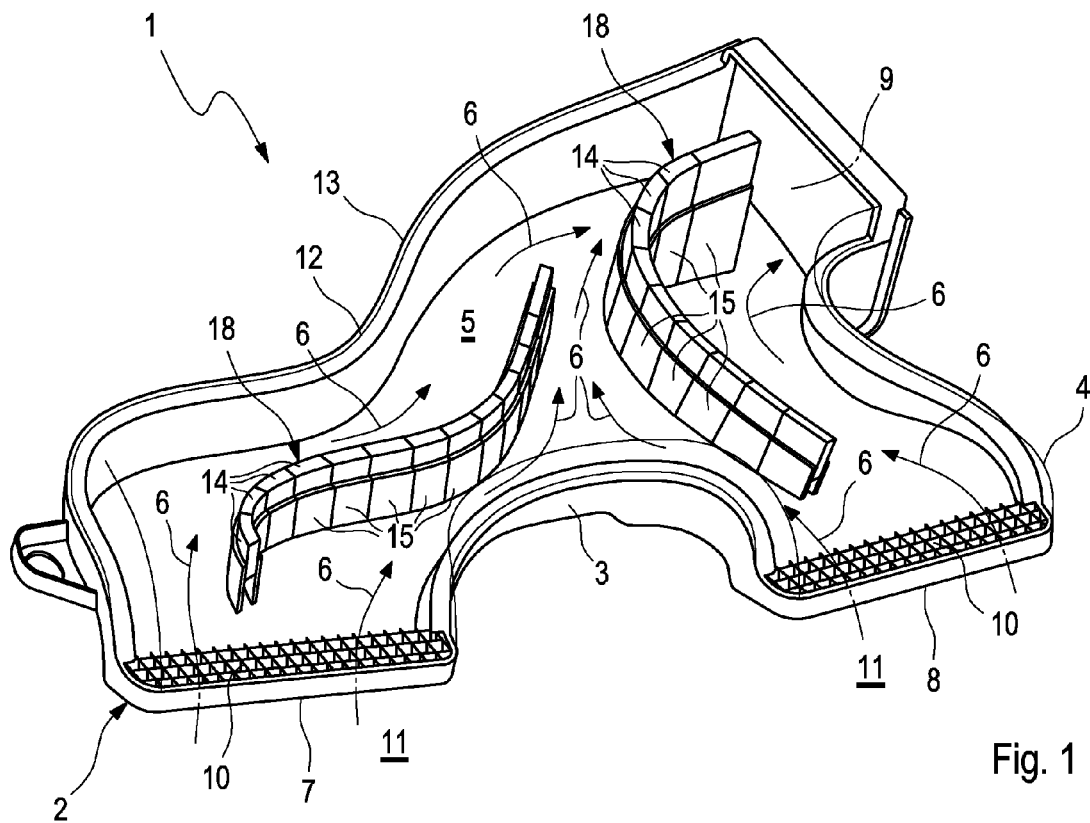
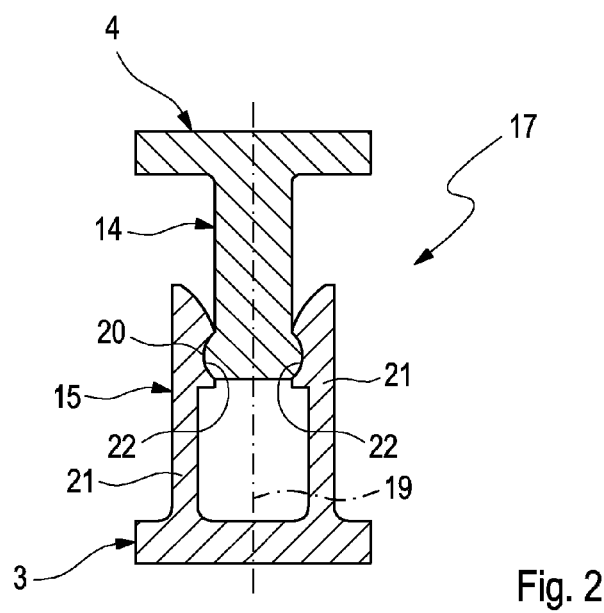
Fig. 1
Fig. 2

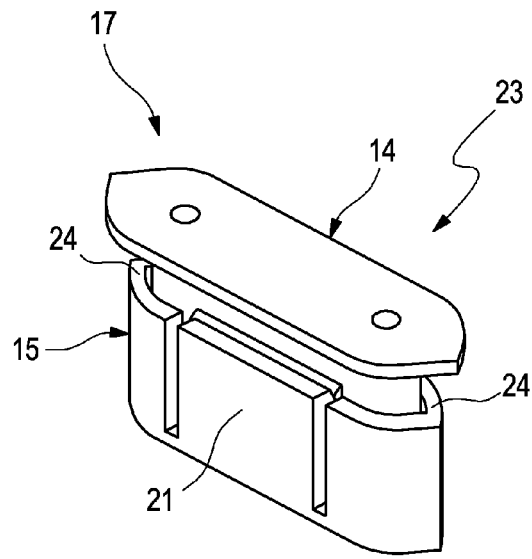
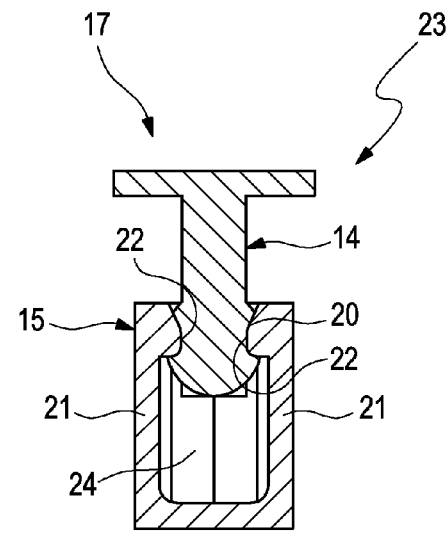
Fig. 3 a   Fig. 3 b
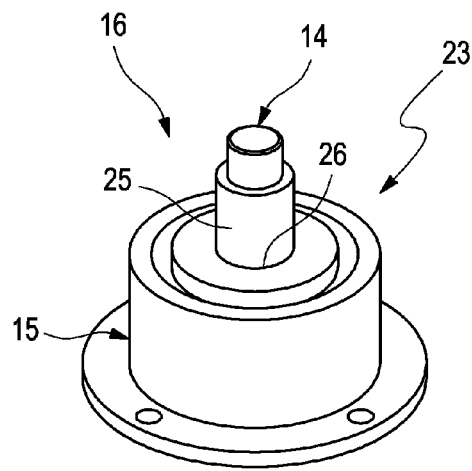
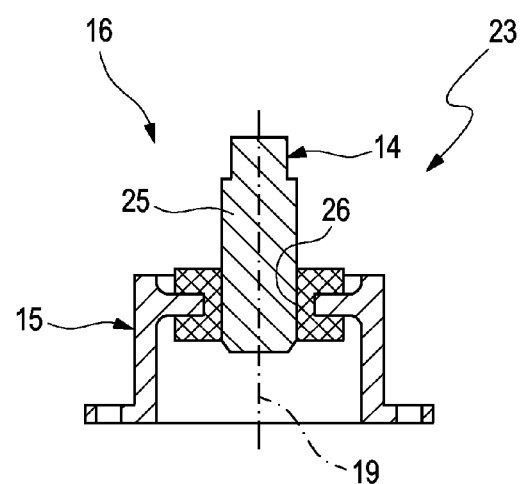
Fig. 4 a   Fig. 4 b

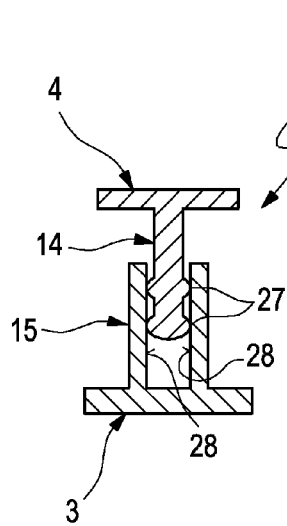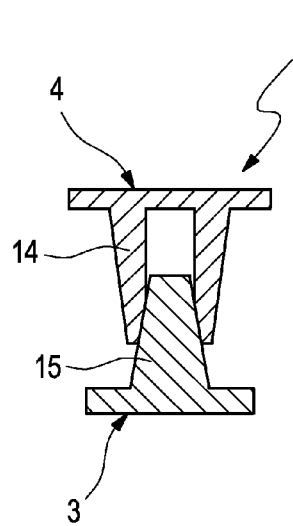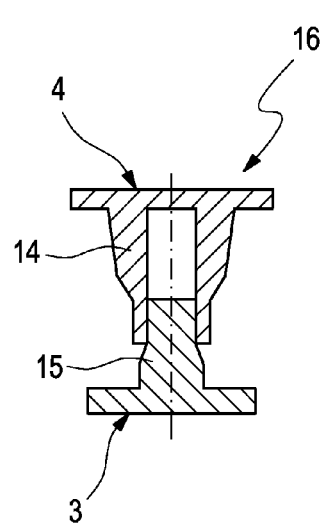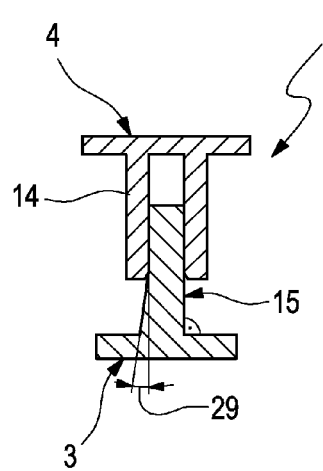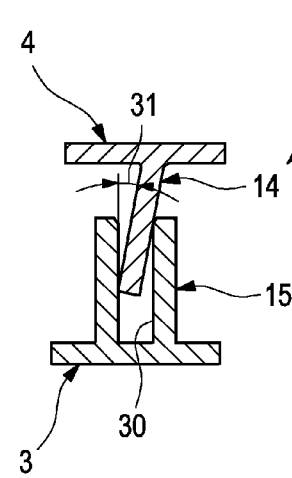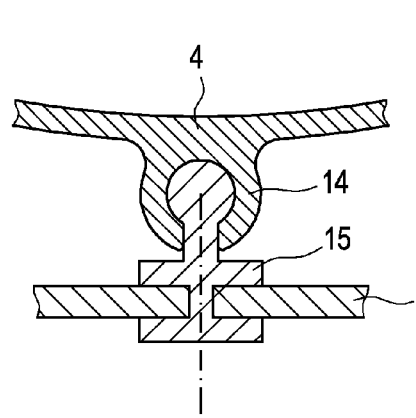

FRESH AIR SYSTEM COMPONENT

CROSS-REFERENCE TO RELATED APPLICATIONS

This application claims priority to German Patent Application No. 10 2012 212 251.6, filed Jul. 12, 2012, and International Patent Application No. PCT/EP2013/064476, filed Jul. 9, 2013, both of which are hereby incorporated by reference in their entirety.

TECHNICAL FIELD

The present invention relates to a fresh air system component for a fresh air system serving to supply fresh air to an internal combustion engine, in particular in a motor vehicle. Such a fresh air system component is for example a filter device or a silencer or a fresh air duct or a fresh air distributor, from which the fresh air is supplied to combustion chambers of the internal combustion engine via individual pipes, in particular suction pipes.

BACKGROUND

Such a component usually comprises a housing, which has a lower shell and an upper shell and delimits at least one fresh air path, which runs from at least one fresh air inlet of the housing to at least one fresh air outlet of the housing.

In vehicle applications, the fresh air system and the components thereof are usually accommodated inside an engine compartment of the vehicle, which is closed on its upper side with the aid of a bonnet. The installation space available in the engine compartment is utilised as much as possible. It can happen that at least one component of the fresh air system is arranged proximally to the bonnet of the engine compartment. In such an arrangement of the respective fresh air system component directly underneath the engine bonnet, pedestrian protection problems can occur if the fresh air system component is situated in a displacement path provided for the engine bonnet, in which the engine bonnet in intended to give in the event of a pedestrian impact.

In order that no rigid, disruptive contours that increase the risk of injury are formed here in the displacement path of the engine bonnet by fresh air system components arranged tightly under said engine bonnet, it is in principle possible for the housing to be produced from a comparatively flexible plastic. The housing of the respective component thereby has a certain ability to yield, so that a collision of the engine bonnet with the component causes a deformation of the housing, which however does not produce any impermissibly high force peaks owing to the flexible materials used.

However, the use of flexible materials for the production of the housing of such a fresh air system component has acoustic disadvantages. Firstly, pressure waves produced by combustion are always transported in the fresh air that is conducted in the fresh air system. Said pressure waves in particular run counter to the flow direction of the fresh air. Secondly, oscillations and vibrations of the internal combustion engine and of the vehicle are transmitted to the fresh air system. Both the internal pressure pulsation and the oscillations and vibrations can cause the housing of the fresh air system component to oscillate, which can result in undesirable emission of noise into the engine compartment and can also be a high mechanical load on the housing.

SUMMARY

The present invention is concerned with the problem of specifying an improved embodiment for a fresh air system component of the above-described type, which in particular can be installed close to an underside of an engine bonnet, while oscillations of the housing are reduced at the same time.

This problem is solved according to the invention by the subject matter of the independent claim. Advantageous embodiments form the subject matter of the dependent claims.

The present invention is based on the general concept of equipping a first shell of a housing with at least one first support element, which is at a distance from a shell edge of the first shell and interacts with a second support element of a second shell, said second support element being formed in a complementary manner to said first support element, in order to transmit tensile and/or compressive forces. In a preferred installation situation, in particular the first shell is a lower shell and the second shell is an upper shell. The upper shell of the housing is then equipped with at least one upper support element, which is at a distance from an upper shell edge of the upper shell and interacts with a lower supporting element, which is complementary thereto, in order to transmit tensile and compressive forces. By means of the support elements that interact with each other, the upper shell can be held in its region that is at a distance from the upper shell edge on another structure, as a result of which the tendency of the upper shell to oscillate can be reduced significantly.

The relative direction and location terms "upper" and "lower" refer to an installation state of the respective fresh air system components in the fresh air system and in an engine compartment of a vehicle. For example, the lower shell of the housing is then situated below the upper shell of the housing, which for its part is situated underneath an engine bonnet. It is however clear that other installation situations are also conceivable in principle.

The upper shell is expediently fastened along its upper shell edge to a lower shell edge of the lower shell, as a result of which the region of the upper shell that is at a distance from the upper shell edge is exposed to an increased oscillation excitation. However, since the support elements are arranged in precisely this region, undesirable natural oscillations of the upper shell can be reduced effectively in this region.

A variant is advantageous in which the upper shell is produced from an upper shell material that is more flexible than a lower shell material from which the lower shell is produced. If the housing is arranged close to an underside of an engine bonnet in an engine compartment, the upper shell is situated proximally to the engine bonnet, whereas the lower shell is arranged distally therefrom. If, in the event of a pedestrian impact on the engine bonnet, the engine bonnet moves into the engine compartment, the engine bonnet hits the flexible upper shell and can deform it without impermissibly high force peaks being produced.

A development is particularly advantageous in which the interacting support elements can be displaced relative to each other reversibly, that is, without being destroyed, and allow upper shell and lower shell to approach each other, at least upwards of a predefined compressive force. Pedestrian protection can be improved further by this measure. In the event of a crash, the upper shell is pressed in the direction of the lower shell by the engine bonnet entering the engine compartment. Since the support elements give and allow a relative displacement between upper shell and lower shell upwards of a predefined compressive force, impermissibly high force peaks can also be avoided in the region of the support elements.

In another advantageous embodiment, the interacting support elements can each form a friction damper, in that the support elements can be displaced relative to each other counter to friction and are held by friction at least in a starting position. The friction dampers can in particular also be configured in such a manner that they hold the support elements against each other by friction in every relative position. The support elements can be displaced relative to each other counter to friction inside the respective friction damper, kinetic energy being converted into heat. This can be used to damp oscillations of the upper shell. The friction dampers can also absorb energy in the event of a crash.

In another advantageous development, to realise such a friction damper, one support element can be a cylindrical pin, while the other support element has a cylindrical pin receptacle, into which the pin is inserted coaxially and can be displaced axially therein counter to friction. This produces an embodiment that can be realised in a particularly simple and thus inexpensive manner for the respective friction damper.

In an alternative embodiment, the interacting support elements can each have a snap closure, in that the support elements are fixed relative to each other in a snapped position by means of retaining forces, it being possible to displace the support elements relative to each other out of the snapped position as soon as compressive forces acting on the snap closure exceed the retaining forces. In such an embodiment, the respective snap closure effects a rigid attachment of the upper shell to the respective structure to which the respective lower support element is fixed for forces that are smaller than the retaining forces of the snap closure. In particular relative movements, for example oscillations, of the upper shell relative to said structure can be avoided thereby. If, however, the retaining forces are overcome by compressive forces in the event of a crash, the respective snap closure allows a relative movement between upper shell and lower shell, so that in this case too impermissibly high force peaks can be avoided.

According to an advantageous development, the respective snap closure can also be configured in such a manner that the support elements can also be displaced relative to each other out of the snapped position if tensile forces acting on the snap closure exceed the retaining forces. It is thus in particular possible to remove the upper shell from the lower shell, for example for maintenance purposes. It can in this case be provided for the retaining forces acting in the compressive direction and the retaining forces acting in the tensile direction to be unequal. For example, the retaining forces effective in the compressive direction can be predefined with relatively narrow tolerances, while the retaining forces acting in the tensile direction can be provided with comparatively large tolerances.

In another advantageous embodiment, it can be provided in order to realise such a snap closure for one support element to have at least one locking contour, while the other support element has at least two spring arms that are resilient transversely to the tensile and compressive force direction and each have a counter locking contour, the counter locking contours being locked with the locking contour when in the snapped position. The geometry of the locking contour or contours allows the retaining forces to be defined for the compressive force direction and for the tensile force direction.

In another advantageous embodiment, the interacting support elements can be configured in a rotationally symmetrical manner in relation to the tensile and compressive force direction. In particular, single supporting points for the region of the upper shell that is at a distance from the upper shell edge can be realised with the aid of such support elements. In particular, the regions of the upper shell that are exposed to an increased risk of oscillation can thereby be supported in a targeted manner.

In an alternative embodiment, the interacting support elements can however be configured in a straight line transversely to the tensile and compressive force direction. Instead of supporting force in a point-shaped manner, in this case a linear support can be realised, as a result of which it is possible to support larger regions of the upper shell in a targeted manner.

If a plurality of support elements is used to support the upper shell, a plurality of interacting support elements can be arranged at a distance from each other and distributed in order to form single support points. In particular, several regions of the upper shell that are exposed to an increased risk of oscillation can thereby be supported in a targeted manner.

Alternatively, it is possible to arrange a plurality of interacting support elements in a targeted manner such that they form at least one cohesive support line, within which a plurality of interacting support elements are arranged in a row. A linear support of the upper shell can be realised thereby, the length of which is greater than the length of a single support element.

A development is particularly expedient in which the respective support line forms a flow-directing contour within the fresh air path. The support elements that interact with each other thereby obtain an additional function, since they also act to guide the fresh air inside the housing.

A development is particularly expedient in which the individual interacting support elements are configured in a straight line along the support line. A comparatively long support line can thereby be realised inside the housing, said line being configured to be comparatively narrow or thin transversely to its longitudinal direction. This can be used in particular to realise a flow-directing contour inside the housing.

According to another advantageous embodiment, at least one lower support element can be formed on the lower shell. In this manner, the upper shell can be supported directly on the lower shell by means of the support elements that interact with each other. Such an embodiment is suitable in particular in the event that the fresh air system component defined a fresh air duct or is formed by a fresh air duct.

Additionally or alternatively, it is possible to form at least one lower support element on an end disc, facing the upper shell, of a filter element inserted into the housing. In this case the fresh air system component is a filter device. The upper shell is in this case supported on the lower shell only indirectly, namely by means of the filter element. This design allows an additional function to be realised for the filter element, namely the oscillation-reducing support of the upper shell. At the same time, the filter device can be made comparatively compact thereby.

The respective upper support element can be a part that is produced separately from the upper shell and is fastened to the upper shell in a corresponding, suitable manner. Alternatively, the respective upper support element can also be formed integrally on the upper shell. The respective lower support element can be a part produced separately from the lower shell and/or from the respective end disc of the filter element. Alternatively, it is likewise possible to form the respective lower support element integrally on the lower shell or integrally on the respective end disc.

A locking connection can be formed between the upper shell edge and the lower shell edge in order to fix the upper shell to the lower shell. In this case it can in particular be provided for the locking contours that interact with each other to produce the locking connection to be formed directly on the upper shell edge and on the lower shell edge. In this case, one shell edge forms a locking contour, while the other shell edge forms a counter locking contour complementary thereto.

To suppress the tendency to oscillate of regions of the housing with a large area, it is in principle conceivable to provide the large-area regions of the upper shell or lower shell that are at risk of oscillation with ribs or beads, which result in a corresponding stiffening of the affected regions. However, this is counterproductive in view of a soft configuration of the upper shell that is desirable for pedestrian protection. A configuration in which at least the upper shell is formed without ribs or beads is therefore preferred.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures,
FIG. 1 schematically shows a perspective view of a fresh air system component,
FIG. 2 schematically shows a highly simplified sectional view of interacting support elements,
FIG. 3-5 schematically show different variants of interacting support elements, each in a perspective view (a), in a sectional view (b) and for FIG. 5 also in a sectional isometric view (c),
FIG. 6-11 each schematically show a highly simplified sectional view of interacting support elements in different embodiments,
FIG. 12 schematically shows a further embodiment of interacting support elements in different states (a) and (b) and in an isometric view of upper support elements (c),
FIG. 13 schematically shows an isometric view of another fresh air system component,
FIG. 14 schematically shows a sectional view of the component of FIG. 13.

DETAILED DESCRIPTION

Figure 5:
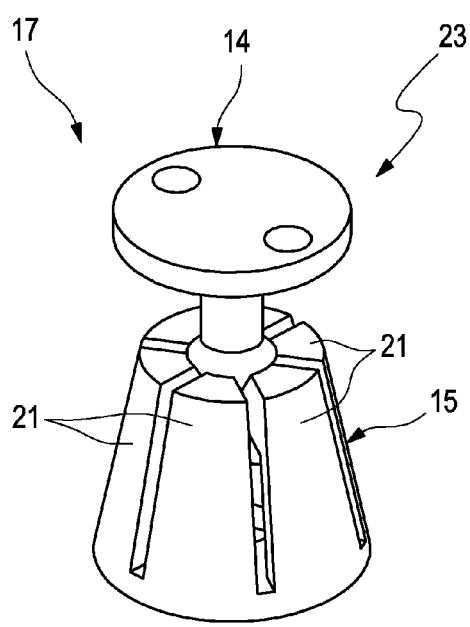
Figure 5:
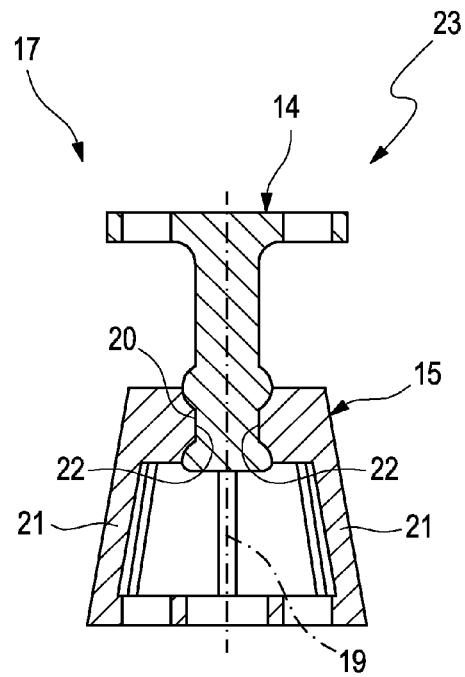
Figure 5:
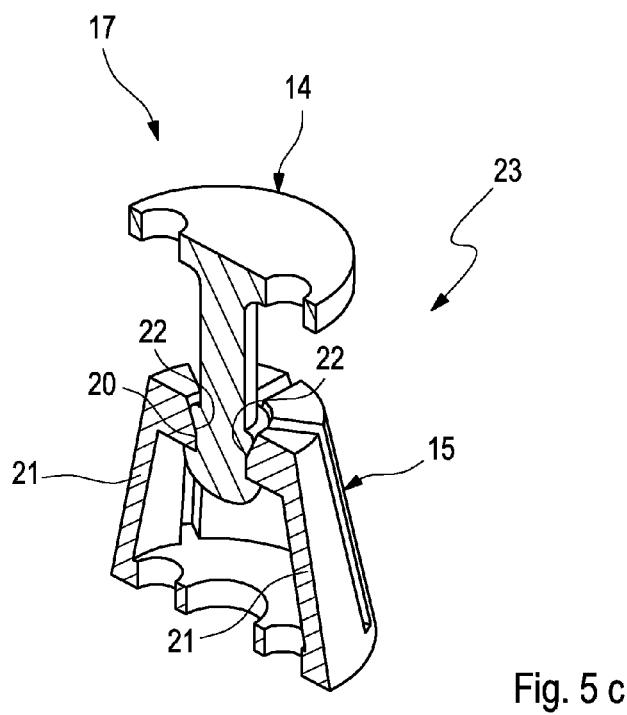

According to FIG. 1, a fresh air system component 1 of a fresh air system used for fresh air supply in an internal combustion engine, in particular in a motor vehicle, comprises a housing 2, which has a lower shell 3 and an upper shell 4. The upper shell 4 is shown transparent in FIG. 1 in order to show an interior 5 of the housing 2. In the interior 5 delimited by the lower shell 3 and the upper shell 4, at least one fresh air path 6 is formed in the housing 2, said fresh air path being indicated in FIG. 1 by arrows. In the example of FIG. 1, a plurality of fresh air paths 6 are formed, which each run from a fresh air inlet 7 or 8 to a fresh air outlet 9. In the example of FIG. 1, the housing 2 has two separate fresh air inlets 7 and 8. The housing 2 is also equipped with a single, common fresh air outlet 9. In the example of FIG. 1, the two fresh air inlets 7, 8 and the fresh air outlet 9 are only formed in the lower shell 3. In particular, each opening is surrounded by a frame, which is formed exclusively by material of the lower shell 3. In the region of each fresh air inlet 7, 8, the lower shell 3 is also provided with a grid structure 10, which can in particular be formed integrally on the lower shell 3. The fresh air system components 1 shown in FIG. 1 is formed as a fresh air duct, which forms an intake region of a fresh air system, so that the fresh air inlets 7, 8 are open towards an environment 11, while the fresh air outlet 9 adjoins the rest of the fresh air system, in particular a filter device.

The upper shell 4 is more flexible than the lower shell 3. In particular, upper shell 4 and lower shell 3 can be produced from the same material, in particular from the same plastic. In this case, the lower shell 3 is stiffened by means of ribs and/or beads, while the upper shell 4 is largely without beads or ribs. An embodiment is preferred in which the upper shell 4 is produced from an upper shell material that is more flexible than a lower shell material from which the lower shell 3 is produced. In addition, it can be provided for the upper shell 4 to be designed without ribs or beads, while the lower shell 3 can in principle be stiffened with the aid of ribs and/or beads.

The upper shell 4 is fastened along an upper shell edge 12 to a lower shell edge 13 of the lower shell 3. In particular, it can be provided for the upper shell edge 12 to be provided with a locking contour and for the lower shell edge 13 to be equipped with a counter locking contour complementary thereto. Locking contour and counter locking contour are designed in such a manner that they produce a locking connection directly between the two shell edges 12, 13.

The upper shell 4 is then equipped with at least one upper support element 14 at a distance from its upper shell edge 12, at least one lower support element 15 being provided in a complementary manner to the respective upper support element 14, the upper support elements 14 interacting with the lower support elements 15 to transmit tensile and compressive forces.

The interacting support elements 14, 15 can thus transmit tensile and compressive forces that act on the upper shell 4. In relation to the upper shell 4, tensile forces are oriented upwards, that is, away from the lower shell 3, while compressive forces are oriented downwards, that is, towards the lower shell 3.

In the example of FIG. 1, the lower support elements 15 are supported on the lower shell 3, so the upper shell 4 is supported on the lower shell 3 by means of the supporting elements 14, 15. The forces acting on the upper shell 4 can thus be transmitted via the interacting support elements 14, 15 to the lower shell 3.

The interacting support elements 14, 15 are expediently designed in such a manner that they can be displaced relative to each other and allow upper shell 4 and lower shell 3 to approach each other, at least upwards of a predefined compressive force. In other words, as soon as a predefined compressive force on the upper shell 4 is achieved, the support elements 14, 15 that interact with each other give, so that the upper shell 4 can move in the direction of the lower shell 3.

Figure 12:
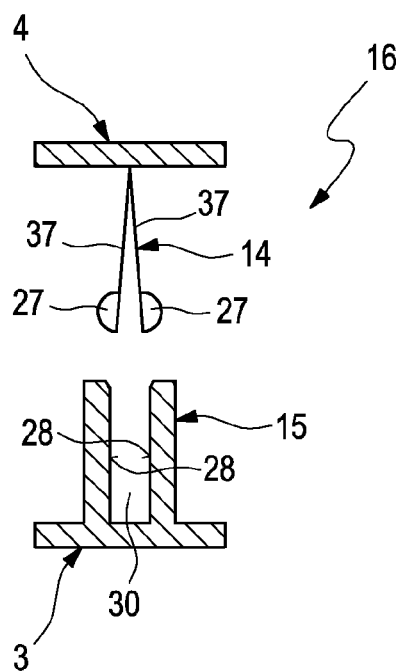
Figure 12:
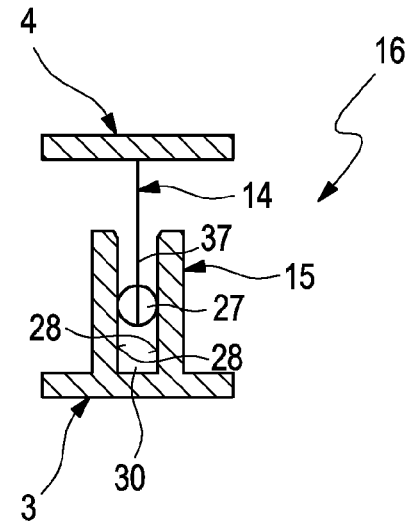
Figure 12:
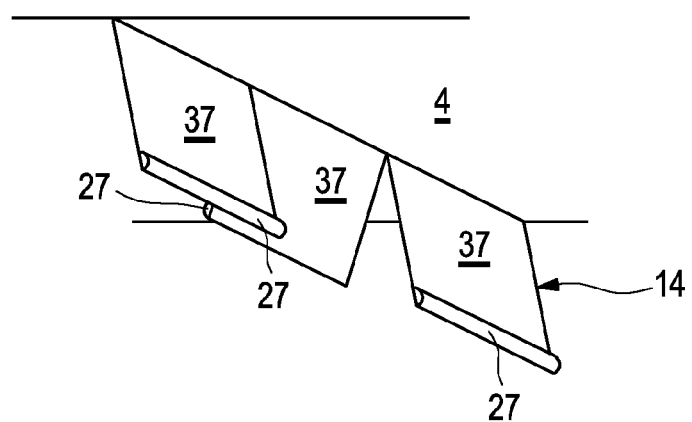

In principle, the interacting support elements 14, 15 can form a friction damper 16, as is shown purely by way of example in FIGS. 4, 6 and 12. In such a friction damper 16, the support elements 14, 15 can be displaced relative to each other counter to friction. The support elements 14, 15 in the friction damper 16 are expediently held against each other by friction, at least in a starting position but preferably in any relative position.

Alternatively, the interacting support elements 14, 15 can each form a snap closure 17, as is shown by way of example in FIGS. 2, 3, 5 and 11. Inside the respective snap closure 17, the interacting support elements 14, 15 are fixed relative to each other in a snapped position by means of retaining forces. The support elements 14, 15 can be displaced relative to each other out of said snapped position as soon as compressive forces acting on the snap closure 17 exceed the retaining forces. The snap closures 17 can optionally also be configured in such a manner that the support elements 14, 15 can also be displaced out of the snapped position as soon as tensile forces acting on the snap closure 17 exceed the retaining forces.

In the embodiment shown in FIG. 1, a plurality of interacting support elements 14, 15 are arranged in a row in such a manner that they form at least one cohesive support line 18 in the housing interior 5. In the example of FIG. 1, two such support lines 18 are formed in the housing interior 5, which run separately from each other and are each formed by a plurality of support elements 14, 15 arranged together in a row. In the housing interior 5, the support lines 18 each form a flow-directing contour, which effects a flow guide for the respective fresh air path 6. The flow resistance of the housing 2 can be reduced by the flow-directing contours, that is, by the support lines 18. As can be seen in FIG. 1, the individual interacting support elements 14, 15 that form the respective support line 18 can each be straight. In this case they are designed to be flat in the flow longitudinal direction or in the longitudinal direction of the respective support line 18, so that their width is much smaller than their length and their height.

The upper support elements 14 can according to FIG. 1 be formed integrally on the upper shell 4. Such an integral design of the upper support elements is also indicated in the variants of FIGS. 2 and 6 to 11. Alternatively to this, it is in principle also possible for the upper support elements 14 to be designed as separate parts from the upper shell 4, which can be fastened in a suitable manner to the upper shell 4. Separate embodiments are for example indicated in FIGS. 3 to 5 and 12. This applies correspondingly to the lower support elements 15, which can be formed integrally on the lower shell 3 according to FIG. 1. Further integrated embodiments for the lower support elements 15 are also indicated in FIGS. 2, 6 to 10 and 12. The lower support elements 15 can likewise be designed as separate parts from the lower shell 3, which can be fastened in a suitable manner to the lower shell 3. Separately produced lower support elements are for example indicated in FIGS. 3 to 5 and 11.

FIG. 2 shows a combination of interacting support elements 14, 15, which form a snap closure 17. The support elements 14, 15 can be formed in a rotationally symmetrical manner in relation to a longitudinal centre axis 19. The longitudinal centre axis 19 is oriented parallel to the tensile and compressive force direction. Alternatively, the support elements 14, 15 can also be straight in relation to the tensile and compressive force direction, so FIG. 2 only shows a cross section of the straight support elements 14, 15 of FIG. 1.

To realise the snap closure 17, the upper support element 14 has a locking contour 20, which in this case has an outwardly convex cross section. The lower support element 15 in this case has at least two spring arms 21, which are resilient transversely to the tensile and compressive force direction and each have a counter locking contour 22. In this case the respective counter locking contour 22 is expediently shaped in a complementary manner to the associated locking contour 20. In the example, the counter locking contours 22 are curved in a concave manner. In the snapped position shown in FIG. 2, the locking contour 20 is locked with the counter locking contours 22.

FIGS. 3a and 3b show another embodiment for interacting support elements 14, 15, with the aid of which a snap closure 17 can likewise be realised. The locking contour 20 and the spring arms 21 with the counter locking contours 22 can again be seen. While the embodiment shown in FIG. 2 is suitable for realising cohesive support lines 18, the variant of the interacting support elements 14, 15 shown in FIG. 3a can preferably be used to realise a single support point 23. In particular, the lower support element 15 can have at each longitudinal end thereof a guide contour 24, which together effect guiding of the two support elements 14, 15 parallel to the tensile and compressive force direction.

Furthermore, in the embodiment of the snap closure 17 shown in FIG. 3, the contouring of the support elements 14, 15 is inverted compared to the embodiment of FIG. 2, so that in the embodiment shown in FIG. 3, the locking contour 20 is concave, while the counter locking contours 22 are convex. In the embodiment shown in FIG. 3, the support elements 14, 15 of the snap closure 17 are likewise straight and flat.

FIGS. 4a and 4b show a configuration in which the interacting support elements 14, 15 form a friction damper 16. To this end, the upper support element 14 is equipped with or configured as a cylindrical pin 25. The lower support element 15 has a cylindrical pin receptacle 26, into which the pin 25 is inserted coaxially. The pin 25 and the pin receptacle 26 correspond to each other in terms of the materials used and the diameter used in such a manner that the pin 25 can be displaced axially in the pin receptacle 26 counter to friction.

In the embodiment shown in FIG. 4, the friction damper 16 is rotationally symmetrical in relation to the longitudinal centre axis 19. The embodiment of the friction damper 16 shown in FIG. 4 is again suitable for realising a single support point 23.

The embodiment shown in FIG. 5 also shows interacting support elements 14, 15, which are rotationally symmetrical in relation to the longitudinal centre axis 19 and which are particularly suitable for realising single support points 23. In this embodiment it can be seen that the lower support element 15 has more than two spring arms 21, which are distributed uniformly in the circumferential direction. To increase the spring forces, the spring arms 21 in the embodiment shown in FIG. 5 are set towards the longitudinal centre axis 19, as a result of which the lower support element 15 has a truncated-cone-shaped geometry overall.

FIG. 6 shows yet another friction damper 16, which can be designed in a rotationally symmetrical or straight manner. Instead of a cylindrical pin 25, the upper support element 14 is in this case equipped with a plurality of friction contours 27, which interact with corresponding friction faces 28 of the lower support element 15.

FIGS. 7 to 9 show further variants for support elements 14, 15 that interact with each other, which are characterised in that at least one of the support elements 14, 15 has a conicity that tapers in the direction of the opposite shells 3, 4. In FIG. 7, both support elements 14, 15 are conical. In FIG. 8, only the lower support element 15 is conical. In FIG. 9, only the lower support element 15 is conical, and only on one side, namely on the left in FIG. 9. A cone angle 29 is indicated purely by way of example in FIG. 9. Owing to the conicity of at least one support element 14, 15, the force necessary to reduce the distance between upper shell 4 and lower shell 3 increases with reducing distance. The forces directed counter to the deformation of the upper shell 4 can thereby increase progressively.

In the embodiment shown in FIG. 10, the upper support element 14 engages in a receptacle 30 in the lower support element 15, an angle 31 being set between the upper support element 14 and the lower support element 15 in a starting position that reduces with reducing distance between upper shell 4 and lower shell 3, which is associated with a corresponding deformation of at least one of the support elements 14, 15.

FIG. 11 shows an embodiment in which the support elements 14, 15 that interact with each other again define a snap closure 17. In this case the lower support element 15 is clipped into the lower shell 3. It can in particular be provided in this case for said clip connection between the lower support element 15 and the lower shell 3 to give upwards of a predefined compressive force, so that the lower support element 15 can be pressed downwards out of the lower shell 3.

FIGS. 12a to 12c show a further embodiment for interacting support elements 14, 15 that form a friction damper 16. As in the embodiment shown in FIG. 10, the lower support element 15 in this case again has a receiving opening 30, into which the upper support element 14 passes. The upper support element 14 is in this case segmented according to FIG. 12c and has segments 37 that are inclined in opposite directions and each have a friction contour 27. As soon as the segments 37 are introduced into the receiving opening 30, they are prestressed in opposite directions counter to the friction faces 28 of the lower support element 15 that delimit the receiving space 30.

Figure 13:
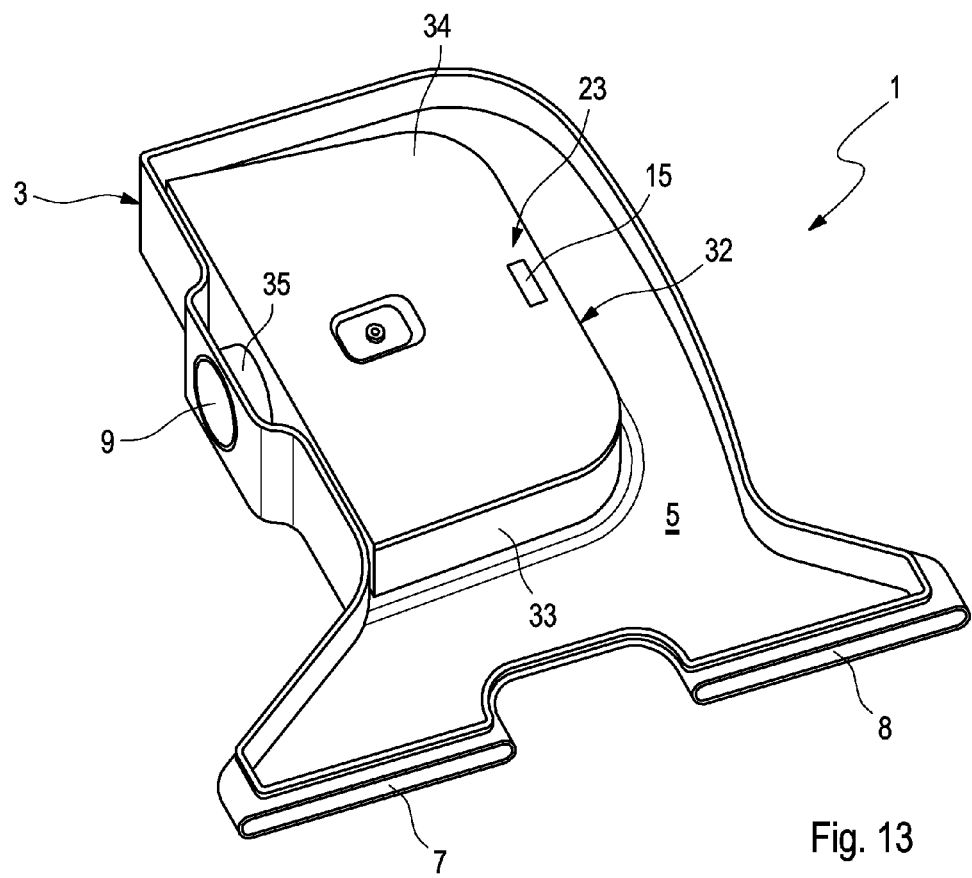
Figure 14:
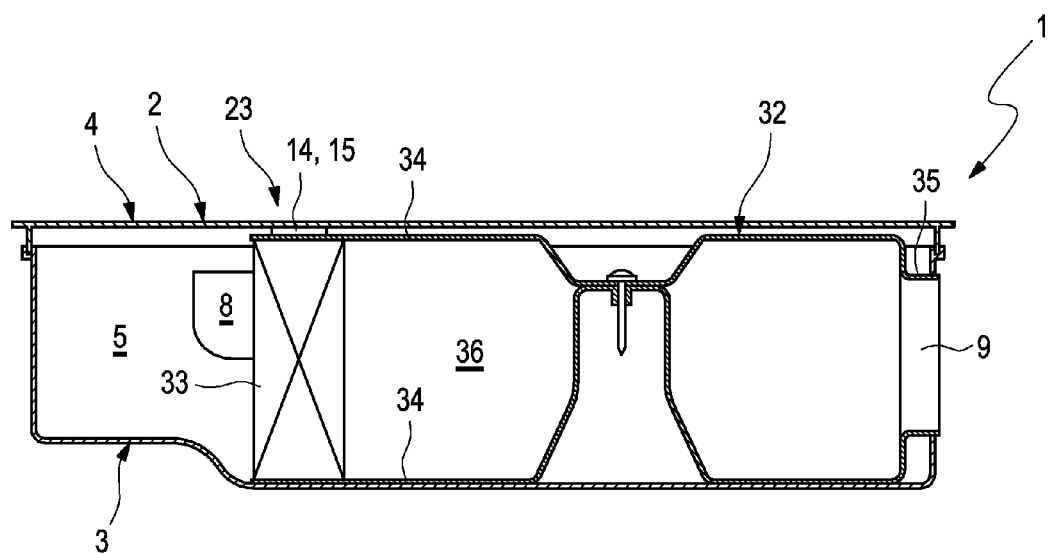

While FIG. 1 shows a fresh air system component 1 that forms a fresh air duct and in which the upper shell 4 is supported directly on the lower shell 3 by means of the support elements 14, 15, FIGS. 13 and 14 show an embodiment in which the fresh air system component 1 is formed by a filter device in which a filter element 32 is arranged in the housing 2. The filter element 32 has a filter body 33, which is closed at each axial end by an end disc 34. The axial direction of the filter element 33 extends vertically when the component 1 is installed, so an upper end disc 34 faces the upper shell 4, while a lower end disc 34 faces the lower shell 3. In the example of FIGS. 13 and 14, at least one lower support element 15 is formed on the upper end disc 34 facing the upper shell 4. The upper shell 4 is not shown in FIG. 13 for better clarity. As can be seen in particular in FIG. 14, the support elements 14, 15 that interact with each other are situated in the region of the filter body 33. It is clear that a plurality of interacting support elements 14, 15 can be provided in the embodiment shown in FIGS. 13 and 14 too in order to define further single support points 23 that are spaced apart from each other.

In the embodiment shown in FIGS. 13 and 14, the housing 2 again has in its lower shell 3 two fresh air inlets 7, 8 and one fresh air outlet 9, to which a connection piece 35 of the filter element 32 is attached. The fresh air passes in this manner through the fresh air inlets 7, 8 into the housing interior 5 and from there through the filter body 33 into an interior 36 of the filter element, from which the fresh air exits from the housing 2 through the connection piece 35 and through the fresh air outlet 9.

The invention claimed is:

1. A fresh air system component of a fresh air system serving to supply fresh air to an internal combustion engine, comprising:
a housing including a first shell and a second shell,
wherein the housing delimits at least one fresh air path, which runs from at least one fresh air inlet of the housing to at least one fresh air outlet of the housing,
the second shell secured along a second shell edge to a first shell edge of the first shell,
wherein the second shell is more flexible than the first shell, and
the second shell includes a second support element, which is arranged at a distance from the second shell edge, and the first shell includes a first support element arranged at a distance from the first shell edge complementary to the second support element, wherein the second support element interacts with the first support element complementary thereto to transmit at least one of a tensile force and a compressive force,
wherein the second shell further includes a plurality of second support elements including the second support element, and the first shell further includes a plurality of first support elements including the first support element, wherein each of the plurality of first support elements is arranged complementary to a corresponding one of the plurality of second support elements, and wherein the plurality of second support elements interact with the plurality of first support elements and are arranged in a row defining at least one cohesive support line spaced apart from the second shell edge and the first shell edge.

2. The component according to claim 1, wherein:
the first shell is a lower shell,
the second shell is an upper shell,
the first shell edge is a lower shell edge,
the second shell edge is an upper shell edge,
the first support element is a lower support element, and
the second support element is an upper support element.

3. The component according to claim 1, wherein at least the first support element and the second support element are displaceable relative to each other and allow the second shell and the first shell to approach each other, at least in response to exceeding a predefined compressive force.

4. The component according to claim 1, wherein at least the first support element and the second support element define a friction damper, wherein the first support element and the second support element are displaceable relative to each other counter to a friction force and are held by the friction force at least in a starting position.

5. The component according to claim 4, wherein one of the first support element and the second support element has a cylindrical pin, and the other of the first support element and the second support element has a cylindrical pin receptacle, the pin receptacle receiving the pin coaxially and the pin being displaced therein counter to the friction force.

6. The component according to claim 1, wherein at least the first support element and the second support element each define a snap closure such that the first support element and the second support element are fixed relative to each other in a snapped position via a retaining force, wherein the first support element and the second support element are displaceable relative to each other out of the snapped position in response to the compressive force acting on the snap closure exceeding the retaining force.

7. The component according to claim 6, wherein the first support element and the second support element are further displaceable relative to each other out of the snapped position in response to the tensile force acting on the snap closure exceeding the retaining force.

8. The component according to claim 6, wherein:
one of the first support element and the second support element has at least one locking contour,
the other of the first support element and the second support element has at least two spring arms, which are resilient transversely to a direction of at least one of the tensile force and the compressive force and each of the at least two spring arms have a counter locking contour,
wherein the respective counter locking contours are locked with the locking contour in the snapped position.

9. The component according to claim 1, wherein at least one of:
the first support element and the second support element are rotationally symmetrical in relation to a direction of at least one of the tensile force and the compressive force, and
the first support element and the second support element are straight transversely to a direction of at least one of the tensile force and the compressive force.

10. The component according to claim 1, wherein the second shell further includes an other plurality of second support elements interacting with an other plurality of first support elements arranged complementary thereto, wherein the other plurality of first support elements interacting with the other plurality of second support elements are arranged at a distance distributed from each other defining a plurality of single support points.

11. The component according to claim 1, wherein the at least one support line forms a flow-directing contour inside the at least one fresh air path.

12. The component according to claim 1, wherein each of the plurality of first support elements interacting with the plurality of second support elements are straight along the support line.

13. The component according to claim 11, wherein the flow-directing contour extends along the at least one fresh air path from the at least one fresh air inlet to the at least one fresh air outlet.

14. The component according to claim 1, further comprising a filter element having an end disc facing, the filter element being inserted into the housing, wherein the at least one first support element is formed on the end disc, wherein the end disc faces the second shell.

15. A fresh air system component of a fresh air system for an internal combustion engine, comprising:
a housing having at least one fresh air inlet and at least one fresh air outlet, the housing including a first shell having a first shell edge and a second shell having a second shell edge, wherein the second shell is configured more flexible than the first shell, and the housing delimiting at least one fresh air path extending from the at least one fresh air inlet to the at least one fresh air outlet, the second shell being secured along the second shell edge to the first shell edge of the first shell;
a plurality of second support elements arranged on the second shell and disposed at a distance from the second shell edge;
a plurality of first support elements arranged on the first shell complementary to and opposite of the plurality of second support elements, wherein the plurality of second support elements interact with and engage the plurality of first support element to transmit a tensile force and a compressive force, and wherein at least some of the plurality of first support elements and at least some of the plurality of second support elements are arranged in a row defining at least one cohesive support line extending along the at least one fresh air path between the at least one fresh air inlet and the at least one fresh air outlet;
wherein at least one first support element of the plurality of first support elements is displaceable relative to at least one second support element of the plurality of second support elements in response to exceeding a predefined compressive force thereby facilitating movement of the second shell in a direction of the first shell; and
a snap closure defined by the at least one first support element and the at least one second support element, wherein the snap closure defines a snap position, in which the at least one first support element is fixed relative to the at least one second support element via a retaining force, and an unsnapped position, in which the at least one first support element is displaceable relative to the at least one second support element in response to the compressive force acting on the snap closure exceeding the retaining force; and
wherein the at least one first support element is further displaceable relative to the at least one second support element in the unsnapped position in response to the tensile force acting on the snap closure exceeding the retaining force.

16. The component according to claim 15, wherein at least some other of the plurality of first support elements and at least some other of the plurality of second support elements are arranged at a distance distributed apart from each other and define a plurality of single support points.

17. A fresh air system component for a fresh air system of an internal combustion engine, comprising:
a housing having a fresh air inlet and a fresh air outlet, the housing including a first shell having a first shell edge and a second shell having a second shell edge, wherein the second shell is secured along the second shell edge to the first shell edge of the first shell, and wherein the housing defines a fresh air path extending from the fresh air inlet to the fresh air outlet;
a plurality of interacting support elements extending transversely to the fresh air path between the first shell and the second shell, the plurality of interacting support elements arranged at a distance from the first shell edge and the second shell edge;
wherein the plurality of interacting support elements include a plurality of first support elements projecting from the first shell and a plurality of second support elements projecting from the second shell, the plurality of first support elements and the plurality of second support elements displaceably interacting with one another to transmit at least one of a tensile force and a compressive force; and
wherein the plurality of interacting support elements are arranged in a row extending along the fresh air path from the fresh air inlet and the fresh air outlet.

18. The component according to claim 17, wherein the plurality of first support elements are arranged at a distance spaced apart from each other and the plurality of second support elements are arranged at a distance spaced apart from each other such that the plurality of interacting support elements define a plurality of single support points.

19. The component according to claim 17, wherein the plurality of first support elements are arranged contacting each other and the plurality of second support elements are arranged contacting each other such that the plurality of interacting support elements define a cohesive support line.

20. The component according to claim 17, wherein the second shell is composed of a material more flexible than that of the first shell.

* * * * *